United States Patent
Ha (10) Patent No.: US 12,182,762 B2
(45) Date of Patent: Dec. 31, 2024

(54) EQUIPMENT MAINTENANCE AND AUTOMATED INVENTORY MANAGEMENT USING PREDICTIVE MODELING

(71) Applicant: International Business Machines Corporation, Armonk, NY (US)

(72) Inventor: SiewMun Ha, Parker, CO (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 17/567,245

(22) Filed: Jan. 3, 2022

(65) Prior Publication Data

US 2023/0214773 A1 Jul. 6, 2023

(51) Int. Cl.
G06Q 30/00 (2023.01)
G06Q 10/0875 (2023.01)
G06Q 10/20 (2023.01)
G06Q 30/0601 (2023.01)

(52) U.S. Cl.
CPC ......... *G06Q 10/0875* (2013.01); *G06Q 10/20* (2013.01); *G06Q 30/0633* (2013.01)

(58) Field of Classification Search
CPC . G06Q 30/00; G06Q 30/0601; G06Q 30/0635
See application file for complete search history.

(56) References Cited

U.S. PATENT DOCUMENTS

| | | | | |
|---|---|---|---|---|
| 6,018,719 A | * | 1/2000 | Rogers | G06Q 20/202 |
| | | | | 705/24 |
| 8,665,118 B1 | * | 3/2014 | Woodard | G08G 1/148 |
| | | | | 705/13 |
| 10,158,480 B1 | * | 12/2018 | Winklevoss | H04L 9/3247 |
| 10,244,355 B1 | * | 3/2019 | DeLuca | H04L 51/224 |
| 10,546,269 B1 | * | 1/2020 | Gaurav | G06Q 10/087 |
| 2002/0019777 A1 | * | 2/2002 | Schwab | G06Q 10/0837 |
| | | | | 705/26.41 |

(Continued)

OTHER PUBLICATIONS

Efrilianda, Devi Ajeng, and R. Rizal Isnanto. "Inventory control systems with safety stock and reorder point approach." 2018 International Conference on Information and Communications Technology (Icoiact). IEEE, 2018. (Year: 2018).*

(Continued)

*Primary Examiner* — Christopher B Seibert
(74) *Attorney, Agent, or Firm* — Edell, Shapiro & Finnan, LLC (57) ABSTRACT

A computer system performs automated inventory management. A service level is determined, using a predictive model, for a count of inventory units for one or more sites of a plurality of sites, wherein the predictive model is provided with a reorder point and reorder quantity as input. In response to determining that the service level does not satisfy a threshold value, the reorder point is adjusted. The adjusted reorder point is determined to yield a service level, according to the predictive model, that satisfies the threshold value. Instructions are automatically transmitted to cause a reorder of inventory units in response to determining that a count of inventory units is below the adjusted reorder point. Embodiments of the present invention further include a method and program product for performing automated inventory management in substantially the same manner described above.

20 Claims, 5 Drawing Sheets

(56) References Cited

U.S. PATENT DOCUMENTS

| | | | | |
|---|---|---|---|---|
| 2002/0188531 A1* | 12/2002 | Junger | G06Q 20/202 | 705/28 |
| 2003/0149635 A1* | 8/2003 | Burklow | G06Q 30/0633 | 705/26.8 |
| 2003/0200006 A1* | 10/2003 | Penkar | G06Q 10/087 | 700/214 |
| 2003/0200155 A1* | 10/2003 | Ouchi | G06Q 30/0641 | 705/26.62 |
| 2003/0216969 A1* | 11/2003 | Bauer | G06K 17/00 | 705/22 |
| 2006/0118631 A1* | 6/2006 | Lubow | G06K 19/06037 | 235/462.01 |
| 2008/0027787 A1* | 1/2008 | Malsbenden | G06Q 30/0631 | 705/7.29 |
| 2008/0162164 A1* | 7/2008 | Segler | G06Q 10/087 | 705/1.1 |
| 2009/0265223 A1* | 10/2009 | Takahashi | G06Q 30/0601 | 705/26.1 |
| 2011/0066514 A1* | 3/2011 | Maraz | G06Q 40/12 | 705/17 |
| 2012/0066253 A1* | 3/2012 | Osborn | G06Q 30/0281 | 707/769 |
| 2012/0278204 A1* | 11/2012 | Urano | G06Q 10/08 | 705/28 |
| 2012/0303492 A1* | 11/2012 | Connors | G06Q 10/0833 | 705/28 |
| 2013/0090959 A1* | 4/2013 | Kvamme | G06Q 10/02 | 705/5 |
| 2013/0238471 A1* | 9/2013 | Maraz | G06Q 10/087 | 705/28 |
| 2014/0108206 A1* | 4/2014 | Chechuy | G06Q 30/0603 | 705/27.1 |
| 2014/0136423 A1* | 5/2014 | Moreton | G06Q 30/012 | 705/302 |
| 2015/0066570 A1* | 3/2015 | Hellen | G06Q 10/06315 | 705/7.25 |
| 2015/0254719 A1* | 9/2015 | Barfield, Jr. | G06Q 30/0261 | 701/31.5 |
| 2015/0356665 A1* | 12/2015 | Colson | G06Q 30/0635 | 705/26.81 |
| 2016/0171432 A1* | 6/2016 | Pugh | G06Q 30/0222 | 705/26.81 |
| 2016/0310838 A1* | 10/2016 | Poisner | H04L 67/10 | |
| 2017/0080332 A1* | 3/2017 | Poisner | A63F 13/215 | |
| 2017/0087453 A1* | 3/2017 | Poisner | A63F 13/23 | |
| 2017/0093848 A1* | 3/2017 | Poisner | G06F 3/017 | |
| 2018/0260867 A1* | 9/2018 | Lin | G06Q 20/405 | |
| 2018/0315111 A1* | 11/2018 | Alvo | G06Q 30/0633 | |
| 2018/0365753 A1* | 12/2018 | Fredrich | H04L 51/046 | |
| 2018/0374021 A1* | 12/2018 | Drayton | G06N 5/04 | |
| 2019/0197466 A1* | 6/2019 | Hand, III | G06V 20/00 | |
| 2019/0303845 A1* | 10/2019 | Funderburg | G06Q 30/04 | |
| 2020/0143313 A1 | 5/2020 | Ohlsson et al. | | |
| 2020/0151654 A1 | 5/2020 | Bradley | | |
| 2020/0242546 A1 | 7/2020 | Konanur | | |
| 2021/0035250 A1 | 2/2021 | Ganesan et al. | | |
| 2021/0117916 A1* | 4/2021 | Paulson | G06Q 10/087 | |
| 2021/0334682 A1* | 10/2021 | Darmour | G06N 3/08 | |
| 2023/0086819 A1* | 3/2023 | Paulson | H04L 9/32 | 705/50 |

OTHER PUBLICATIONS

Cognominal, Malgorzata, Krystyna Patronymic, and Agnieszka Wańkowicz. "Evolving Field of Autonomous Mobile Robotics: Technological Advances and Applications." Fusion of Multidisciplinary Research, An International Journal 2.2 (2021): 189-200. (Year: 2021).*

* cited by examiner

EQUIPMENT MAINTENANCE AND AUTOMATED INVENTORY MANAGEMENT USING PREDICTIVE MODELING

BACKGROUND

1. Technical Field

Present invention embodiments relate to equipment maintenance and automated inventory management, and more specifically, to maintaining equipment and performing automated inventory management of maintenance items using predictive modeling.

2. Discussion of the Related Art

In the field of predictive modeling, models can be developed to predict when particular events will take place, such as an outage of a service or an inventory unit. A two-echelon inventory system is a particular approach to maintaining maintenance items, such as spare parts, in which a region is serviced by a central site and remote sites, with the central site acquiring the maintenance items and providing the maintenance items to the remote sites on their behalf Because each site is subject to a random demand for the maintenance item, predicting the amount of items for a region can be difficult.

SUMMARY

According to one embodiment of the present invention, a computer system performs automated inventory management. A service level is determined, using a predictive model, for a count of inventory units for one or more sites of a plurality of sites, wherein the predictive model is provided with a reorder point and reorder quantity as input. In response to determining that the service level does not satisfy a threshold value, the reorder point is adjusted. The adjusted reorder point is determined to yield a service level, according to the predictive model, that satisfies the threshold value. Instructions are automatically transmitted to cause a reorder of inventory units in response to determining that a count of inventory units is below the adjusted reorder point. Embodiments of the present invention further include a method and program product for performing automated inventory management in substantially the same manner described above. Accordingly, present invention embodiments enable fully-automated inventory management.

In some embodiments, the plurality of sites include a base site and one or more remote sites, and wherein the base site provides inventory units to the one or more remote sites. Accordingly, present invention embodiments extend automated inventory management to two-echelon models. In some embodiments, the predictive model further uses as input a mean daily demand for each site of the plurality of sites, a variance of the daily demand for each site of the plurality of sites, an average issue size at each site of the plurality of sites, a mean supplier lead time for shipments of the inventory units, a variance of the supplier lead time for shipments of the inventory units, a price per inventory unit, an item stockout cost parameter for each site of the plurality of sites, an item purchase cost parameter for each site of the plurality of sites, an item holding cost parameter for each site of the plurality of sites, and a central-to-remote site transfer time. Thus, data collected from each site is used to increase the accuracy of the predictive model, thereby optimizing the management of inventory units. In some embodiments, the predictive model further determines a total annual cost for the inventory units for the plurality of sites. Knowing the total annual cost for inventory units enables inventory to be managed in a manner that reduces cost. In some embodiments, an autonomous device is controlled to automatically maintain equipment at a site of the plurality of sites using the inventory units. Thus, inventory management and maintenance of equipment can be connected to fully-automate the entire process. In some embodiments, the autonomous device replaces an inventory unit within the equipment. Thus, the maintenance operation may be fully-automated. In some embodiments, determining that the service level does not satisfy the threshold value comprises comparing the service level of the base site to the threshold value. Accordingly, the service level of the base site can be used to determine an optimal reorder point value.

BRIEF DESCRIPTION OF THE DRAWINGS

Generally, like reference numerals in the various figures are utilized to designate like components.

DETAILED DESCRIPTION

Present invention embodiments relate to equipment maintenance and automated inventory management, and more specifically, to a computerized system for maintaining equipment and performing automated inventory management of maintenance items in a two-echelon inventory system using an artificial intelligence-based predictive model A two-echelon inventory system is commonly used in the management of maintenance items or other items that are consumed during use equipment use, such as spare parts, lubricants, hydraulic fluids, and the like. In a two-echelon inventory system, a region is serviced by establishing a central site (e.g., a factory that acts as a local headquarters) and remote sites. The central site and the remote site are all subject to a random demand for the maintenance items; each remote site stocks a supply of inventory units that is ideally sufficient for its local demand, and the remote sites rely on the central site to replenish their inventory. Thus, the central site stocks inventory for its own local demand plus the demand of the remote sites.

Each site may use a continuous-review reorder point, reorder quantity inventory policy. In this policy, the inventory level is continuously monitored by an artificial intelligence-based predictive model as inventory units are consumed, and when the count falls below the reorder point, an order quantity equal to the reorder quantity is automatically placed by the computing system. The central site receives shipments of the inventory units from an external supplier that may have a random lead time for each shipment. In order to optimize a two-echelon system, the reorder point and/or reorder quantity should be set to appropriate levels by a computing system to achieve an optimal balance of three inventory cost components: the stockout cost (e.g., cost incurred due to a site running out of the inventory unit), the purchase cost (e.g, the cost of purchasing inventory units), and the holding cost (e.g., the cost of storing the items at each site).

However, optimizing reorder points and/or reorder quantities can be difficult in two-echelon systems due to the random demand for each maintenance item. Accordingly, present invention embodiments perform automated inventory management using a computerized predictive model to account for the random demand and to determine optimal values for the reorder point and/or reorder parameters. In particular, present invention embodiments employ a predictive model that determines the service level for each site, which is the probability that a site does not stock out of the item over a reorder cycle. If the service level is too low relative to a region's requirements, then the reorder point can be increased to obtain a more satisfactory level.

Thus, the embodiments presented herein improve computerized inventory management systems using a predictive model that is trained to more accurately predict the service level for each site in a two-echelon system, and automatically adjusts the reorder point to optimize inventory management. Additionally, present invention embodiments can determine the total inventory cost for a region that uses a two-echelon system. Moreover, the predictive model can support autonomous maintenance devices (e.g., robots) at each site that can automatically obtain the maintenance items and apply the maintenance items to equipment. Accordingly, present invention embodiments provide the practical application of fully-automating the maintenance of equipment by using a predictive model to ensure an optimal supply of maintenance items at each site, and by using autonomous maintenance devices to further automate the act of maintenance itself. Thus, present invention embodiments improve the management and utilization of maintenance equipment in a two-echelon system.

In some embodiments, the plurality of sites include a base site and one or more remote sites, and wherein the base site provides inventory units to the one or more remote sites. Accordingly, present invention embodiments extend automated inventory management to two-echelon models. In some embodiments, the predictive model further uses as input a mean daily demand for each site of the plurality of sites, a variance of the daily demand for each site of the plurality of sites, an average issue size at each site of the plurality of sites, a mean supplier lead time for shipments of the inventory units, a variance of the supplier lead time for shipments of the inventory units, a price per inventory unit, an item stockout cost parameter for each site of the plurality of sites, an item purchase cost parameter for each site of the plurality of sites, an item holding cost parameter for each site of the plurality of sites, and a central-to-remote site transfer time. Thus, data collected from each site is used to increase the accuracy of the predictive model, thereby optimizing the management of inventory units. In some embodiments, the predictive model further determines a total annual cost for the inventory units for the plurality of sites. Knowing the total annual cost for inventory units enables inventory to be managed in a manner that reduces cost. In some embodiments, an autonomous device is controlled to automatically maintain equipment at a site of the plurality of sites using the inventory units. Thus, inventory management and maintenance of equipment can be connected to fully-automate the entire process. In some embodiments, the autonomous device replaces an inventory unit within the equipment. Thus, the maintenance operation may be fully-automated. In some embodiments, determining that the service level does not satisfy the threshold value comprises comparing the service level of the base site to the threshold value. Accordingly, the service level of the base site can be used to determine an optimal reorder point value.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
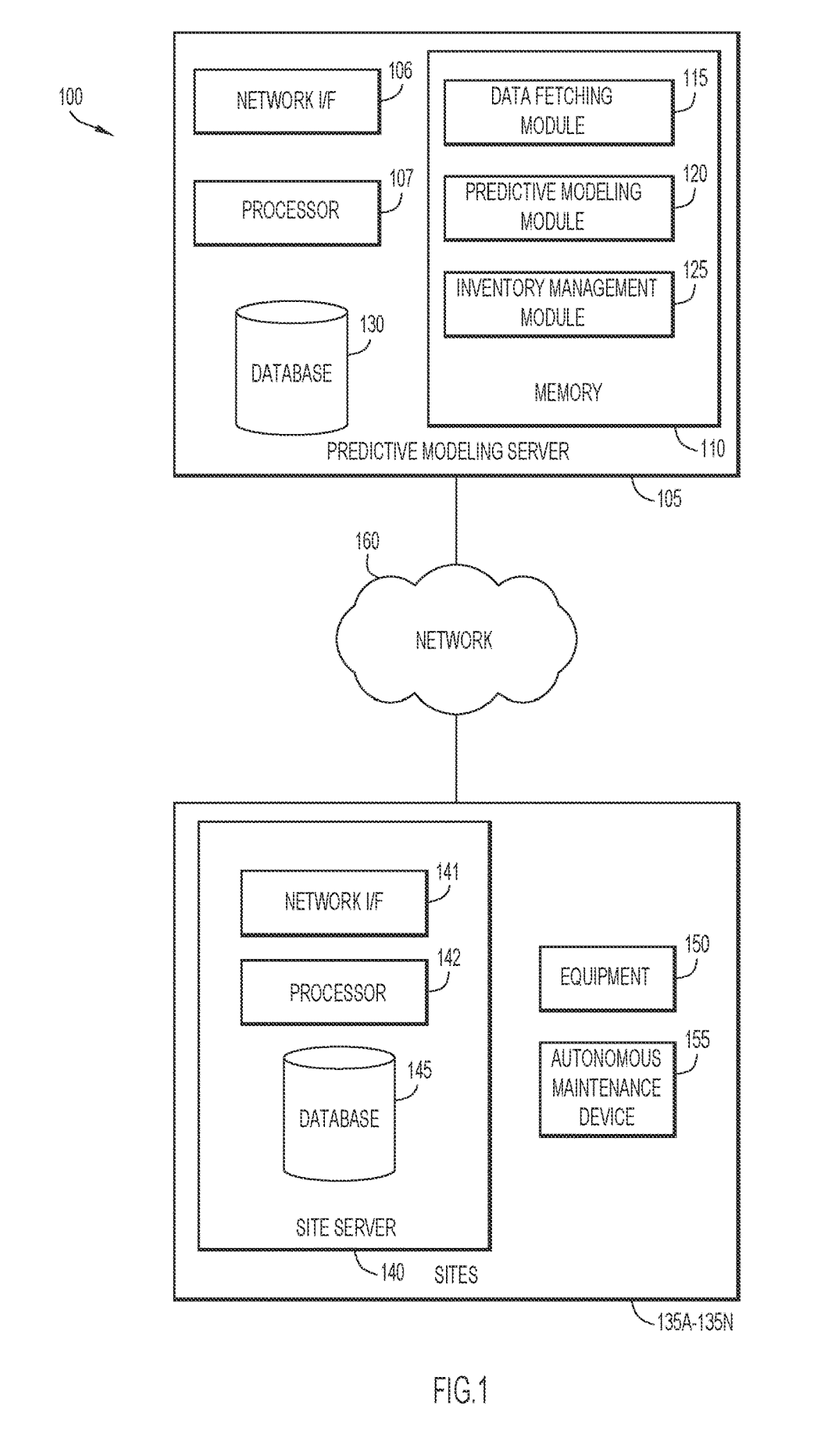
FIG. 1 is a block diagram depicting a computing environment for automated inventory management in accordance with an embodiment of the present invention.

Present invention embodiments will now be described in detail with reference to the Figures. FIG. 1 is a block diagram depicting a computing environment 100 for predictive modeling and automated inventory management in accordance with an embodiment of the present invention. As depicted, computing environment 100 includes a predictive modeling server 105, a plurality of sites 135A-135N, and a network 160. It is to be understood that the functional division among components of computing environment 100 have been chosen for purposes of explaining present invention embodiments and is not to be construed as a limiting example.

Predictive modeling server 105 includes a network interface (I/F) 106, at least one processor 107, memory 110, and a database 130. Memory 110 includes a data fetching module 115, a predictive modeling module 120, and an inventory management module 125. Predictive modeling server 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of predictive modeling server 105 to send and receive data over a network, such as network 160. In general, predictive modeling server 105 performs predictive modeling for demand of inventory units, and performs inventory management for a two-echelon system. Predictive modeling server 105 may include internal and external hardware components, as depicted and described in further detail with respect to FIG. 5.

Data fetching module 115, predictive modeling module 120, and inventory management module 125 may include one or more modules or units to perform various functions of present invention embodiments described below. Data fetching module 115, predictive modeling module 120, and inventory management module 125 may be implemented by any combination of any quantity of software and/or hardware modules or units, and may reside within memory 110 of predictive modeling server 105 for execution by a processor, such as processor 107.

Data fetching module 115 may obtain data from each site (e.g., sites 135A-135N) in a regional two-echelon system. The data that is obtained from each site may relate to the stock and/or consumption of inventory units, which can include maintenance items for equipment. In some embodiments, data fetching module 115 may obtain data that includes a mean and variance of the daily demand (e.g., demand for the inventory unit), an average issue size at each site (e.g., the number of inventory units), the mean and variance of the supplier lead time (e.g., the time that a supplier requires to provide inventory units), the unit price per item, the item stockout cost parameter (e.g., the lost income and expense associated with an inventory shortage), the item purchase cost parameter (e.g., the cost per order of inventory units), the item holding cost parameter (e.g., the cost to retain an inventory of the units per year), and the central-to-remote site transfer time (e.g., the time, in days, to transfer units from the central site to the remote site). Data fetching module 115 may obtain data from sites on an ad hoc basis (e.g., when the data becomes available) and/or according to a predetermined schedule (e.g., every day, every hour, etc.). Data obtained by data fetching module 115 may be stored in database 130 of predictive modeling server 105, and data fetching module 115 may associate metadata with the obtained data, such as timestamps and/or the identity of the particular site from which data is obtained.

Predictive modeling module 120 may provide a predictive model that determines a service level for each site 135A-135N with respect to inventory units, and a total annual cost of the inventory units. Based on the service level for each site, the reorder point and/or reorder quantity is automatically adjusted to optimize inventory management. In some embodiments, an initial reorder point and/or reorder quantity are provided to the predictive model, and based on additional input data, the values for the reorder point and/or reorder quantity are subsequently adjusted. The reorder point may be a number of inventory units at which a new order should be placed, and the reorder quantity may include a count of inventory units to be ordered whenever the reorder point is reached. The predictive model may receive, via data fetching module 115, input that includes one or more of: a mean and variance of the daily demand for each site, an average issue size at each site, the mean and variance of the supplier lead time for shipments of the inventory units, the price per inventory unit, the item stockout cost parameter for each site, the item purchase cost parameter, the item holding cost parameter for each site, and/or the central-to-remote site transfer time. A predictive model in accordance with a present invention embodiment is depicted and described in further detail with respect to FIG. 3.

In some embodiments, predictive modeling module 120 may train and apply a machine learning model to perform some or all of the predictive tasks. In particular, a machine learning model can be trained using historical samples of inputs and associated outputs to perform the predictive tasks. In various embodiments, the machine learning model may include a forecasting model, such as an artificial neural network, a long short-term memory (LSTM)-based neural network, a random forest, a regression neural network, a K-nearest neighbors regression network, a support vector machine (SVM)-based model, and/or any other machine learning model suitable for performing predictive tasks.

In some embodiments, the machine learning model may be trained using a training set of data that includes examples of input-output pairs in which the input data including one or more of: a mean and variance of the daily demand for each site, an average issue size at each site, the mean and variance of the supplier lead time for shipments of the inventory units, the price per inventory unit, the item stockout cost parameter for each site, the item purchase cost parameter, the item holding cost parameter for each site, and/or the central-to-remote site transfer time, and in which the output data includes one or more of: a service level for each site, and a total annual cost for inventory for a region. In some embodiments, the machine learning model may be updated based on actual results (e.g., comparing the predicted outputs to the actual service level for one or more sites and/or the actual total annual cost for inventory for a region) to continuously retrain the machine learning model, thus improving the accuracy of the predictive modeling performed in accordance with present invention embodiments over time.

Inventory management module 125 may manage inventory units based on a current count of inventory units at each site in combination with data obtained from predictive modeling module 120. In some embodiments, inventory management module 125 maintains a database of counts of inventory units per site, as well as consumption rates of inventory units and/or other metrics. In some embodiments, inventory management module 125 transmits instructions, based on the reorder point and/or reorder quantity, to cause shipments of inventory units to be provided. For example, inventory management module 125 may transmit a request to a network-accessible system associated with the external supplier of the inventory units; the request may indicate a count of inventory units requested. In some embodiments, inventory management module 125 may transmit instructions to cause shipments of inventory units to be automatically transferred from a central site to a particular remote site. The instructions may specify a remote site and a count of inventory units. In some embodiments, the instructions to cause shipments of inventory units to be transferred from a central site to a remote site are automatically transmitted in response to inventory management module 125 determining that a service level for the remote site has exceeded a threshold value.

Database 130 may include any non-volatile storage media known in the art. For example, database 130 can be implemented with a tape library, optical library, one or more independent hard disk drives, or multiple hard disk drives in a redundant array of independent disks (RAID). Similarly, data in database 130 may conform to any suitable storage architecture known in the art, such as a file, a relational database, an object-oriented database, and/or one or more tables. In some embodiments, database 130 may store data including input data for a predictive model (e.g., data obtained from sites 135A-135N), predictive modeling data (including any data output by a predictive model), and/or inventory management data (including reorder points, reorder quantities, inventory unit counts by site, and the like).

Each site 135A-135N may include a site server 140, equipment 150, and one or more autonomous maintenance devices 155. Each site server 140 includes a network interface (I/F) 141, at least one processor 142, and a database 145. Each site server 140 may include a laptop computer, a tablet computer, a netbook computer, a personal computer (PC), a desktop computer, a personal digital assistant (PDA), a smart phone, a thin client, a rack-mounted server, or any programmable electronic device capable of executing computer readable program instructions. Network interface 141 enables components of each site server 140 to send and receive data over a network, such as network 160. Each site server 140 may include internal and external hardware components, as depicted and described in further detail with respect to FIG. 5.

In general, each site server 140 may collect and store data relating to inventory units at a site of sites 135A-135N, including a count of inventory units over time. The data may be collected by, or generated by, site server 140 on an ad hoc basis (e.g., when a shipment of inventory units is received, when an inventory unit is used, etc.), or according to a predetermined schedule (e.g., every day, every hour, etc.). Each site server 140 may obtain, may be provided with, or may generate, a mean and variance of the daily demand for each site, an average issue size at each site, the mean and variance of the supplier lead time for shipments of the inventory units, the price per inventory unit, the item stockout cost parameter for each site, the item purchase cost parameter, the item holding cost parameter for each site, and/or the central-to-remote site transfer time.

Database 145 may include any non-volatile storage media known in the art. For example, database 145 can be implemented with a tape library, optical library, one or more independent hard disk drives, or multiple hard disk drives in a redundant array of independent disks (RAID). Similarly, data in database 145 may conform to any suitable storage architecture known in the art, such as a file, a relational database, an object-oriented database, and/or one or more tables. Database 145 may store data for a site that includes a mean and variance of the daily demand for each site, an average issue size at each site, the mean and variance of the supplier lead time for shipments of the inventory units, the price per inventory unit, the item stockout cost parameter for each site, the item purchase cost parameter, the item holding cost parameter for each site, and/or the central-to-remote site transfer time.

Equipment 150 may include any physical equipment for producing products, refining input, providing physical services, and the like. Equipment 150 may physically transform an input into an output, such as a sheet of metal into a machined product, etc. During the course of operation, equipment 150 may require maintenance, such as the replacement of a part with a spare part, the application of a lubricant, and the like. Thus, the operation of equipment 150 may present a random demand for the inventory units that are managed in a two-echelon inventory management system of present invention embodiments.

Autonomous maintenance device 155 may be an autonomous device (e.g., a robot) that services equipment 150. In response to a failure of equipment 150 or other event that results in equipment 150 requiring maintenance, autonomous maintenance device 155 may automatically obtain an inventory unit and apply the inventory unit to equipment 150. In various embodiments, autonomous maintenance device 155 may remove a part and insert a spare part, may apply a lubricant, may insert a fuel or energy source, and the like. In response to autonomous maintenance device 155 performing an action that consumes one or more inventory units, site server 140 may be automatically notified so that a count of inventory units may be updated.

Network 160 may include a local area network (LAN), a wide area network (WAN) such as the Internet, or a combination of the two, and includes wired, wireless, or fiber optic connections. In general, network 160 can be any combination of connections and protocols known in the art that will support communications between predictive modeling server 105 and site server 140 of each site 135A-135N via their respective network interfaces in accordance with embodiments of the present invention.

Figure 2:
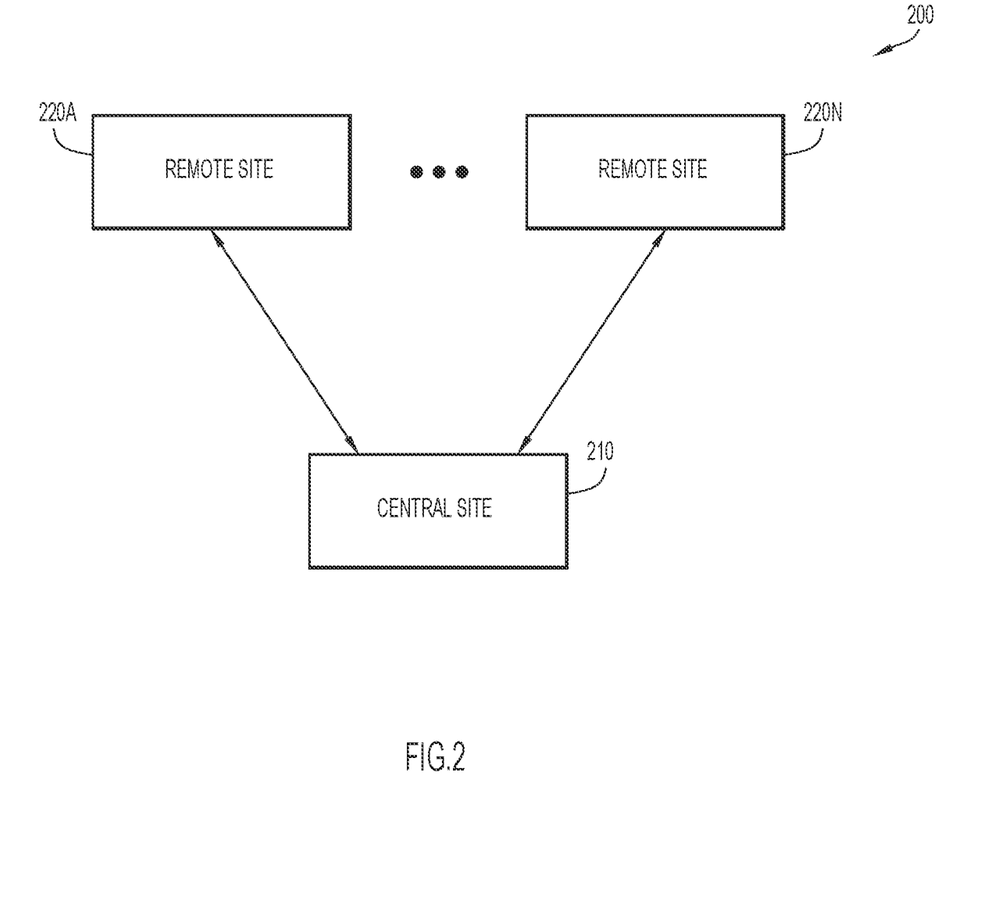
FIG. 2 is a block diagram depicting a two-echelon system in accordance with an embodiment of the present invention.

FIG. 2 is a block diagram depicting a two-echelon system 200 in accordance with an embodiment of the present invention. As depicted, two-echelon system 200 includes a central site 210 and a plurality of remote sites 220A-220N. These sites may correspond to sites 135A-135N of computing environment 100 (as depicted and described in further detail with reference to FIG. 1).

In the two-echelon system 200 of FIG. 2, a region is serviced by a central site 210 and a plurality of remote sites 220A-220N. Both the central site 210 and remote sites 220A-220N may perform some activity that creates a random demand for inventory units (e.g., replacement parts, lubricant, other consumables, etc.). Central site 210 may stock inventory units for itself and for remote sites 220A-220N. In some embodiments, central site 210 retains an additional inventory of inventory units in case that a remote site requires the units. Additionally or alternatively, central site 210 acquires inventory units on behalf of remote sites 220A-220N and transfers those inventory units to each remote site 220A-220N when a delivery is made to central site 210. In some embodiments, each remote site 220A-220N provides data to central site 210 regarding a current and/or historical count of inventory units, or count of inventory units over time.

Figure 3:
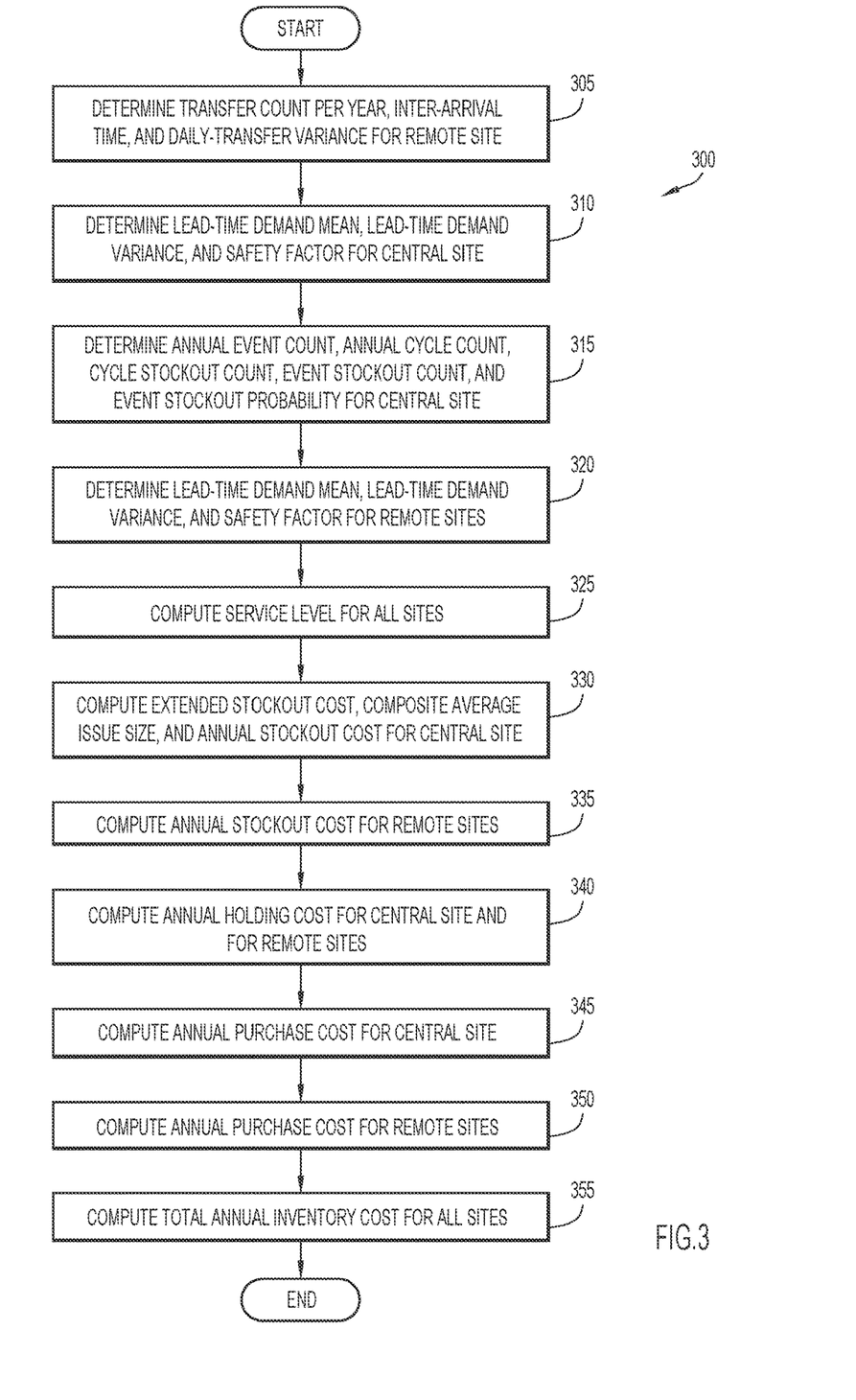
FIG. 3 is a flow chart depicting a method for predictive modeling in accordance with an embodiment of the present invention.

FIG. 3 is a flow chart depicting a method 300 for predictive modeling in accordance with an embodiment of the present invention.

The transfer count per year, the transfer inter-arrival time, and the daily transfer variance for the remote sites are determined at operation 305. Initially, the predictive model of method 300 is provided with the following inputs: a reorder point (e.g., a number of inventory units at which a new order should be placed) and reorder quantity, a mean and variance of the daily demand (e.g., demand for the inventory unit), an average issue size at each site (e.g., the number of inventory units), the mean and variance of the supplier lead time (e.g., the time that a supplier requires to provide inventory units), the unit price per item, the item stockout cost parameter (e.g., the lost income and expense associated with an inventory shortage), the item purchase cost parameter (e.g., the cost per order of inventory units), the item holding cost parameter (e.g., the cost to retain an inventory of the units per year), and the central-to-remote site transfer time (e.g., the time, in days, to transfer units from the central site to the remote site). These inputs can be determined by collecting data at the central site and at each remote site; for example, the inputs can be obtained from the site server 140 of each site 135A-135N.

As used herein for equations (1)-(24) of method 300, the subscript i may serve as a location index, with i=0 denoting the central site, and i=1, . . . , n denoting each of the n remote sites of the two-echelon model.

The transfer count per year may indicate the total number of units that are transferred from the central site to all of the remote sites, and may be determined according to equation (1):

$$n_{T,i} = \frac{365\mu_{D,i}}{Q_i}; i = 1, \ldots n \qquad (1)$$

where $n_T$ is the transfer count of units per year, $\mu_D$ is the daily demand mean (in inventory units per day), and Q is the reorder quantity (in inventory units). The transfer inter-arrival time, which may represent the difference in time between the arrival of one shipment of inventory units and a next shipment of inventory units, may be determined for each remote site according to equation (2):

$$\tau_i = \frac{365}{n_{\tau,i}}; i = 1, \ldots n \qquad (2)$$

where $\tau$ is the transfer inter-arrival time (in days). Next, the daily transfer variance may be determined according to equation (3):

$$\sigma_{\tau,i}^2 = (Q_i - \mu_{D,i})^2 \frac{1}{\tau_i} + (0 - \mu_{D,i})^2 \frac{\tau_i - 1}{\tau_i}; i = 1, \ldots n \qquad (3)$$

where $\sigma_\tau^2$ is the daily transfer variance (in (inventory units per day)$^2$).

The lead-time demand mean, the lead-time demand variance, and the safety factor are determined for the central site at operation 310. The lead-time demand mean, which may represent the mean of the total demand for inventory units between a current time and the anticipated time of the delivery of the next shipment of inventory units (if a reorder is placed at the current time), can be determined according to equation (4):

$$\mu_{LTD,0} = \mu_{T,0} \Sigma_{i=0}^n \mu_{D,i} \qquad (4)$$

where $\mu_{LTD}$ represents the lead-time demand (in inventory units), and $\mu_T$ represents the lead time mean (in days). Similarly, the lead-time demand variance can be calculated using the lead-time demand mean according to equation (5):

$$\sigma_{LTD,0}^2 = \mu_{T,0}(\sigma_{D,0}^2 + \Sigma_{i=1}^n \sigma_{\tau,i}^2) + \sigma_{T,0}^2(\Sigma_{i=0}^n \mu_{D,i})^2 \qquad (5)$$

where $\sigma_D^2$ represents the daily demand variance (in (inventory units per day)$^2$). The safety factor for the central site, which is a unitless value that indicates how much extra inventory units should be stocked at the central site, can be determined according to equation (6):

$$z_0 = \frac{s_0 - \mu_{LTD,0}}{\sigma_{LTD,0}} \qquad (6)$$

where z is the safety factor, and s is the reorder point (in inventory units). For example, if z=0.5, then the safety factor would indicate that 50% more inventory units should be stocked as extra units at the central site.

The annual event count, the annual cycle count, the cycle stockout count, the event stockout count, and the event stockout probability are calculated for the central site at operation 315. The annual event count may be the number of inventory unit transfer events per year (e.g., transfers from the central site to a remote site), and may be determined according to equation (7):

$$n_{E,0} = \frac{365 \mu_{D,0}}{a_0} + \sum_{i=1}^n n_{\tau,i} \qquad (7)$$

where $n_E$ is the event count (in events per year), and $\alpha_0$ is the average issue size for the central site (in number of inventory units). The annual cycle count, which is the number of sets of inventory units that are cycled through each year, can accordingly be determined with equation (8):

$$n_{C,0} = \frac{365 \sum_{i=0}^n \mu_{D,i}}{Q_0} \qquad (8)$$

where $n_C$ is the annual cycle count, and $Q_0$ is the reorder quantity for the central site (in number of inventory units).

The cycle stockout count, which may represent the count of times that an entire set of inventory has been cycled through, can be determined according to equation (9):

$$n_{CS,0} = \left[1 - \frac{1}{1 + e^{-1.7 z_0}}\right] n_{C,0} \qquad (9)$$

where $n_{CS}$ is the cycle stockout count (in events per year). The coefficient −1.7 may be determined by performing a least-squares fit of the logistic function to a normal cumulative distribution. The event stockout count, which may indicate the number of times that no inventory is currently in stock per year, may be determined according to equation (10):

$$n_{ES,0} = n_{CS,0} \cdot \frac{1}{a_0} \cdot \left[\max\left(\frac{T_0}{3}, 1\right)\right] \mu_{D,0} \qquad (10)$$

Where $T_0$ is the mean supplier lead time (in days). The event stockout probability, which is the likelihood of an event stockout, can then be determined by dividing the event stockout count by the annual event count, as shown in equation (11):

$$p_{S,0} = \frac{n_{ES,0}}{n_{E,0}} \qquad (11)$$

where $p_S$ is the event stockout probability, a percentage value.

The lead-time demand mean, lead-time demand variance, and the safety factor is determined for the remote sites at operation 320. The lead-time demand mean, which may measure mean demand for inventory units during the lead time, can be determined according to equation (12):

$$\mu_{LTD,i} = \mu_{D,i}[(1-p_{S,0})T_\tau + p_{S,0}(T_\tau + T_0)]; i=1, \ldots n \qquad (12)$$

Where $\sigma_{LTD}$ is the lead time demand mean (in number of inventory units), $T_\tau$ is the central-to-remote site transfer time (in days), and $T_0$ is the lead-time mean for the supplier to the base site (in days). Next, the lead-time demand variance can be calculated using equation (13):

$$\sigma_{LTD,i}^2 = (1-p_{S,0})T_\tau \sigma_{D,i}^2 + p_{S,0}[(T_\tau + T_0)\sigma_{D,i}^2 + \mu_{D,i}^2 \sigma_{T,0}^2]; i=1, \ldots n \qquad (13)$$

where $\sigma_{LTD}^2$ is lead time demand variance (in (inventory units per day)$^2$), $\sigma_T^2$ may represent the lead time variance (in (inventory units per day)$^2$), and $\sigma_D^2$ may represent the daily demand variance (in (inventory units per day)²). The safety factor for each remote site can then be computed according to equation (14):

$$z_i = \frac{s_i - \mu_{LTD,i}}{\sigma_{LTD,i}}; i = 1, \ldots n \tag{14}$$

Where z is the safety factor, and s is the reorder point (in inventory units).

The service level for all sites, including both the remote sites and the central site, is determined at operation 325. The service level can be determined according to equation (15):

$$\alpha_i = \frac{1}{1 + e^{-1.7z_i}}; i = 0, \ldots n \tag{15}$$

Where α is the service level for each site. The coefficient −1.7 may be determined by performing a least-squares fit of the logistic function to a normal cumulative distribution. The service level may be a percentage that indicates the probability of being able to satisfy the inventory requirement, and can accordingly be used to automatically manage inventory in accordance with present invention embodiments. The service level can be used to assess the adequacy of the reorder point in providing sufficient inventory units to protect against random variation in demand and lead time. Thus, the service level can be computed for each remote site to determine that site's likelihood of running out of inventory.

The extended stockout cost parameter, the composite average issue size, and the annual stockout cost are determined for the central site at operation 330. The extended stockout cost parameter, which is the cost to stock a set of inventory units per cycle, can be determined according to equation (16):

$$C_{ES,0} = \frac{1}{a_0} \mu_{D,0} \left[ \max\left(\frac{T_0}{3}, 1\right) \right] C_{S,0} + C_{E,0} \tag{16}$$

Where $C_{ES}$ is the extended stockout cost parameter (in currency units (e.g., dollars) per cycle), $C_S$ is the stockout cost parameter (in currency units (e.g., dollars) per event), and $C_E$ is the expediting cost parameter (in currency units (e.g., dollars) per order), which represents the additional cost to expedite the order. The composite average issue size, which may represent a number of inventory units required by the central site per year, may be determined according to equation (17):

$$a_C = \frac{365\mu_{D,0} + \sum_{i=1}^{n} Q_i n_{\tau,i}}{\frac{1}{a_0} 365\mu_{D,0} + \sum_{i=1}^{n} n_{\tau,i}} \tag{17}$$

where $\alpha_C$ is the composite average issue size (in inventory units), and $n_\tau$ is the transfer count of inventory units to a given remote site (in inventory units per year). Next, the annual stockout cost, which is the total annual cost imposed by running out of inventory stock, can be computed using according to equation (18):

$$A_{S,0} = (1 - \alpha_i) \frac{365 \sum_{i=0}^{n} \mu_{D,i}}{Q_0} C_{ES,0} \tag{18}$$

where $A_S$ is the annual stockout cost (in currency units (e.g., dollars) per year).

The annual stockout cost is determined for the remote sites at operation 335. This annual stockout cost may be determined for each remote site according to equation (19):

$$A_{S,i} = (1 - \alpha_i) \frac{365\mu_{D,i}}{Q_i} C_{S,i}; i = 1, \ldots n \tag{19}$$

where $A_S$ is the annual stockout cost (in currency units (e.g., dollars) per year).

The annual holding cost is determined for the central site, and for the remote sites, at operation 340. The annual holding cost may represent the total annual cost of retaining inventory units in an inventory, and can be determined according to equation (20):

$$A_{H,0} = \max \begin{bmatrix} s_0 - \mu_{LTD,0} - \frac{1}{2}a_C + \frac{1}{2}Q_0, \\ \frac{1}{2}\left(s_0 - \mu_{LTD,0} - \frac{1}{2}a_C + s_0 + \frac{1}{2}Q_0\right) \end{bmatrix} C_{H,0} p_0 \tag{20}$$

for the central site, and according to equation (21):

$$A_{H,i} = \max \begin{bmatrix} s_i - \mu_{LTD,i} - \frac{1}{2}a_i + \frac{1}{2}Q_i, \\ \frac{1}{2}\left(s_i - \mu_{LTD,i} - \frac{1}{2}a_i + s_i + \frac{1}{2}Q_i\right) \end{bmatrix} C_{H,i} p_i; i = 1, \ldots n \tag{21}$$

For the remote sites, where $A_H$ is the annual holding cost (in currency units (e.g., dollars) per year), $C_H$ is the holding cost parameter (e.g., the cost to retain an inventory of the units per year, in currency units per currency units per year (e.g., $/$/yr)), and p is the inventory unit price (in currency units (e.g., dollars) per inventory unit).

The annual purchase cost is determined for the central site at operation 345. The annual purchase cost may reflect the total annual cost of purchasing inventory units for the central site, and can be determined according to equation (22):

$$A_{P,0} = \frac{365 \sum_{i=0}^{n} \mu_{D,i}}{Q_0} C_{P,0} \tag{22}$$

where $A_{P,0}$ is the annual purchase cost (in currency units (e.g., dollars) per year) for the central site, and $C_P$ is the purchase cost parameter (in currency units (e.g., dollars) per order).

The annual purchase cost is determined for the remote sites at operation 350. The annual purchase cost may reflect the total annual cost for purchasing inventory units for each remote site, and can be determined according to equation (23):

$$A_{P,i} = n_{\tau,i} \cdot C_{P,i} \tag{23}$$

Where $A_{P,i}$ is the annual purchase cost (in currency units (e.g., dollars) per year) for each remote site.

The total annual inventory cost is determined for all sites at operation 355. The total annual inventory cost may represent the total annual cost of acquiring and storing inventory units for the central site and for the remote sites, and can be determined by summing the annual costs for each site according to equation (24):

$$A_R = \Sigma_{i=0}^{n}(A_{S,i} + A_{H,i} + A_{P,i}) \quad (24)$$

where $A_R$ may represent the total annual regional cost for a central site and its remote sites. Accordingly the total annual regional cost can be predicted.

In some embodiments, the output total annual regional cost and/or the service level for each site can be provided to a machine learning model (e.g., the machine learning model of predictive modeling module 120) to train or retrain the machine learning model (e.g., to use as training data or to augment a set of historical examples of inputs and associated outputs). The output total annual regional cost and/or the service level for each site, as determined according to method 300, may be used in combination with historical data to train a machine learning model to more accurately predict total annual regional cost and/or service levels for a variety of regions that are subject to different inputs (e.g., mean demand, etc.) and/or have other regional differences (e.g., more or fewer remote sites, different distances between a central cite and remote sites, etc.). For example, if historical training data includes few or no examples of particular inputs or other regional differences, more examples of training data can be generated according to the embodiments presented herein.

Figure 4:
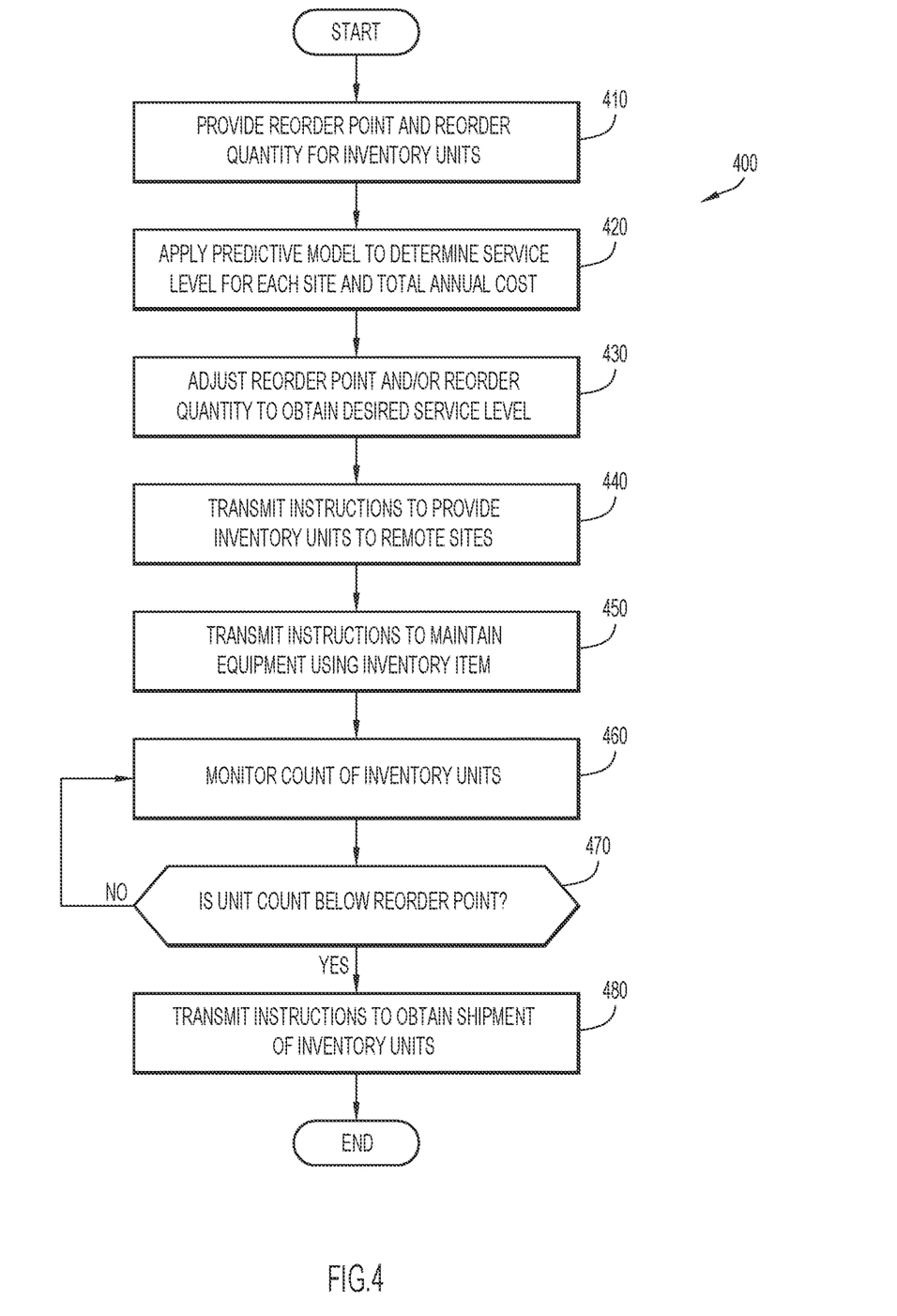
FIG. 4 is a flow chart depicting a method of automated inventory management based on a predictive model in accordance with an embodiment of the present invention.

FIG. 4 is a flow chart depicting a method 400 of automated inventory management based on a predictive model in accordance with an embodiment of the present invention.

A reorder point and a reorder quantity are provided for inventory units at operation 410. The reorder point may indicate a threshold number of inventory units for a base site of a two-echelon model that is used to determine when to purchase additional units. Thus, when the current inventory falls below the reorder point, an order for another shipment of inventory units may be automatically placed. The reorder quantity may correspond to the count of units included in the order for a shipment of units. For example, if a reorder point is fifty units, and a reorder quantity is seventy units, when a base site's inventory count falls below fifty units, an order is placed for seventy units. The reorder point and reorder quantity may be provided to an predictive modeling system such as predictive modeling server 105.

A predictive model is applied to determine a service level for each site and a total annual cost for a region serviced by a two-echelon model at operation 420. The predictive model may utilize as input the reorder point and reorder quantity to determine the service level and total annual cost for a region. Additionally, the predictive model may be provided with input that is collected from the base site and/or remote sites, such as a mean and variance of the daily demand for each site, an average issue size at each site, the mean and variance of the supplier lead time for shipments of the inventory units, the price per inventory unit, the item stockout cost parameter for each site, the item purchase cost parameter, the item holding cost parameter for each site, and/or the central-to-remote site transfer time. The predictive model may output a service level for each site, which indicates a probability that a site does not stock out of the item over a reorder cycle. The service level may be determined according to equation (15), which is depicted and described with reference to FIG. 3. In some embodiments, the predictive model outputs the total annual cost of inventory units for a region (e.g., for a central site and its remote sites), which reflects the cost of purchasing inventory units, the cost of running out of inventory units, and the cost of storing inventory units. The total annual cost may be determined according to equation (24), which is depicted and described with reference to FIG. 3.

The reorder point and/or the reorder quantity are adjusted to obtain a desired service level for one or more of the sites at operation 430. The predicted service level for each site can be compared to a threshold value to determine if the service levels are acceptable, and the reorder point and/or reorder quantity can be adjusted accordingly until the predicted service levels satisfy the threshold. For example, a threshold of 90% may cause a reorder point and/or reorder quantity to be determined that would yield a service level of 90% for one or more sites, which indicates a likelihood of 90% that the one or more sites will not run out of inventory. In some embodiments, the service level of the base site is compared to the threshold value. In some embodiments, the service level of the base site and the remote sites are all compared to the threshold value, and if all of the sites pass, the reorder point and/or reorder quantity are selected. In some embodiments, a predefined number of sites must satisfy the threshold value, such as the base site and a particular percentage (e.g., 50%) of the remote sites.

Instructions are transmitted to provide inventory units from the central site to the remote sites at operation 440. The remote sites may be provided with inventory units according to a particular cycle, which may be predefined or determined by the predictive model. In general, inventory units are provided to the central site in an amount that is at least sufficient to meet the random demand at each remote site.

Instructions are transmitted to maintain equipment using inventory units at operation 450. In response to determining that an equipment item requires maintenance, instructions may be transmitted to an autonomous maintenance device to apply the inventory unit to the equipment. Once an inventory unit is consumed (e.g., via maintenance of equipment), the inventory count may be updated for the site at which the inventory unit was consumed. The instructions may be generated by a site server (e.g., site server 140) of the particular site whose equipment requires maintenance, and may include an identity of a particular inventory unit to be used for maintenance and/or a particular piece of equipment that requires maintenance. For example, the instructions may include a stock-keeping unit (SKU) for a particular inventory unit, and an autonomous maintenance device may scan a barcode on inventory units to select the particular inventory unit.

The count of inventory units is monitored at operation 460. The count of inventory units may be monitored at the central site. An accurate count of inventory units may be maintained by adjusting the count each time that an inventory unit is consumed at the central site and/or each time that inventory units are sent from the central site to one or more remote sites. Accordingly, the predictive model may be dynamically updated based on feedback acquired by monitoring inventory units at one or more sites. In particular, the predictive model can be dynamically updated with counts of inventory units to continuously adjust the reorder point and/or reorder quantity values, thereby providing a self-optimizing inventory management system.

Operation 470 determines whether the count of inventory units is below the reorder point. If the count of inventory units at the central site is not currently below the reorder point, method 400 continues to monitor the count of inventory units at operation 460. If the count of inventory units falls below the reorder point, instructions are transmitted to obtain a shipment of inventory units from the external supplier at operation 480. The instructions may be executed to automatically obtain additional inventory units at a count equal to the reorder quantity.

Figure 5:
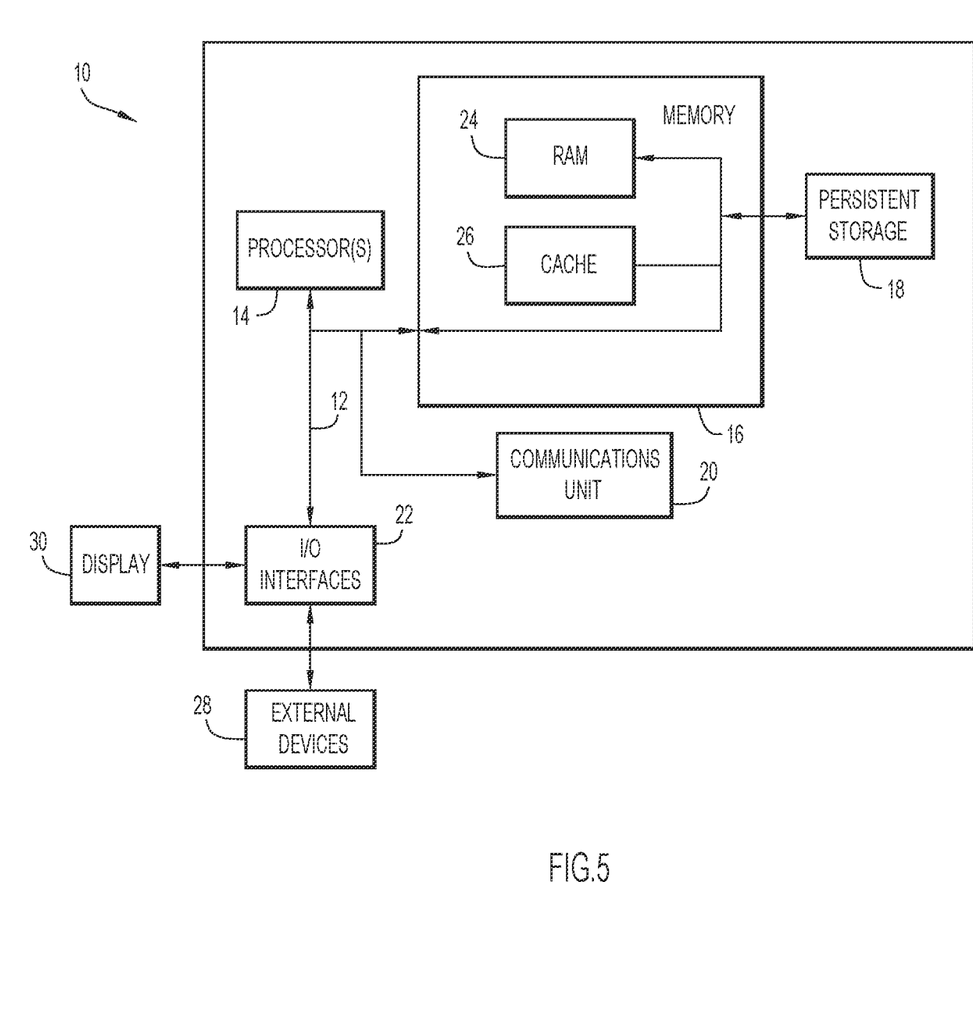
FIG. 5 is a block diagram depicting a computing device in accordance with an embodiment of the present invention.

FIG. 5 is a block diagram depicting components of a computer 10 suitable for executing the methods disclosed herein. Computer 10 may implement predictive modeling server 105 and/or site server 140 of sites 135A-135N in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to performing predictive modeling (e.g., data relating to counts, transfer times, lead times, prices, and/or consumption of inventory units, predictive model data, etc.) may be stored within any conventional or other data structures (e.g., files, arrays, lists, stacks, queues, records, etc.) and may be stored in any desired storage unit (e.g., database, data or other repositories, queue, etc.). The data transmitted between predictive modeling server 105 and/or site server 140 of each site 135A-135N may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to performing predictive modeling (e.g., data relating to counts, transfer times, lead times, prices, and/or consumption of inventory units, predictive model data, etc.) may include any information provided to, or generated by, predictive modeling server 105 and/or site server 140 of each site 135A-135N. Data relating to performing predictive modeling may include any desired format and arrangement, and may include any quantity of any types of fields of any size to store any desired data. The data relating to performing predictive modeling may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to performing predictive modeling), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of improving inventory management for two-echelon models.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, data fetching module 115, predictive modeling module 120, inventory management module 125, etc.). These systems may include any types of monitors and input devices (e.g., keyboard, mouse, voice recognition, etc.) to enter and/or view information.

It is to be understood that the software (e.g., communications software, server software, data fetching module 115, predictive modeling module 120, inventory management module 125, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, data fetching module 115, predictive modeling module 120, inventory management module 125, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to performing predictive modeling). The database system may be implemented by any number of any conventional or other databases, data stores or storage structures (e.g., files, databases, data structures, data or other repositories, etc.) to store information (e.g., data relating to performing predictive modeling). The database system may be included within or coupled to the server and/or client systems. The database systems and/or storage structures may be remote from or local to the computer or other processing systems, and may store any desired data (e.g., data relating to performing predictive modeling).

The present invention embodiments may employ any number of any type of user interface (e.g., Graphical User Interface (GUI), command-line, prompt, etc.) for obtaining or providing information (e.g., data relating to performing predictive modeling), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, optimizing inventory management for any items that are subject to random demand.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for performing automated inventory management, the method comprising:
   determining a service level, using a predictive model, for
      a count of inventory units for one or more sites of a plurality of sites, wherein the predictive model is provided with a reorder point and reorder quantity as input, wherein the predictive model further uses as input a mean daily demand for each site of the plurality of sites, an average issue size at each site of the plurality of sites, a mean supplier lead time for shipments of the inventory units, a price per inventory unit, and a central-to-remote site transfer time, and wherein the count of inventory units for the one or more sites is determined based on a notification that an autonomous robotic device at a particular site has performed an action that consumes one or more inventory units;

in response to determining that the service level does not satisfy a threshold value, adjusting the reorder point;

determining that the adjusted reorder point yields a corresponding service level, wherein the input to the predictive model is used to determine that, according to the predictive model, the corresponding service level provided by the adjusted reorder point satisfies the threshold value;

automatically transmitting instructions, using a network interface, to cause a reorder of inventory units in response to determining that a count of inventory units is below the adjusted reorder point; and controlling the autonomous robotic device, by transmitting instructions using the network interface to the autonomous robotic device, to automatically maintain equipment at a site of the plurality of sites using the inventory units, wherein the autonomous robotic device automatically maintaining the equipment causes one or more inventory units to be consumed by removing at least one consumed inventory unit from the equipment and inserting at least one new inventory unit into the equipment.

2. The computer-implemented method of claim 1, wherein the plurality of sites include a base site and one or more remote sites, and wherein the base site provides inventory units to the one or more remote sites.

3. The computer-implemented method of claim 1, wherein the predictive model further uses as input a variance of the daily demand for each site of the plurality of sites, a variance of the supplier lead time for shipments of the inventory units, an item stockout cost parameter for each site of the plurality of sites, an item purchase cost parameter for each site of the plurality of sites, and an item holding cost parameter for each site of the plurality of sites.

4. The computer-implemented method of claim 1, wherein the predictive model further determines a total annual cost for the inventory units for the plurality of sites.

5. The computer-implemented method of claim 1, wherein the autonomous device causes the one or more inventory units to be consumed by performing an action selected from a group of: replacing a part of the equipment, applying a lubricant to the equipment, and inserting a fuel or energy source into the equipment.

6. The computer-implemented method of claim 2, wherein determining that the service level does not satisfy the threshold value comprises comparing the service level of the base site to the threshold value.

7. A computer system for performing automated inventory management, the computer system comprising:
one or more computer processors;
one or more computer readable storage media;
program instructions stored on the one or more computer readable storage media for execution by at least one of the one or more computer processors, the program instructions comprising instructions to:

determine a service level, using a predictive model, for a count of inventory units for one or more sites of a plurality of sites, wherein the predictive model is provided with a reorder point and reorder quantity as input, wherein the predictive model further uses as input a mean daily demand for each site of the plurality of sites, an average issue size at each site of the plurality of sites, a mean supplier lead time for shipments of the inventory units, a price per inventory unit, and a central-to-remote site transfer time, and wherein the count of inventory units for the one or more sites is determined based on a notification that an autonomous robotic device at a particular site has performed an action that consumes one or more inventory units;

in response to determining that the service level does not satisfy a threshold value, adjust the reorder point;

determine that the adjusted reorder point yields a corresponding service level, wherein the input to the predictive model is used to determine that, according to the predictive model, the corresponding service level provided by the adjusted reorder point satisfies the threshold value;

automatically transmit instructions, using a network interface, to cause a reorder of inventory units in response to determining that a count of inventory units is below the adjusted reorder point; and control the autonomous robotic device, by transmitting instructions using the network interface to the autonomous robotic device, to automatically maintain equipment at a site of the plurality of sites using the inventory units, wherein the autonomous robotic device automatically maintaining the equipment causes one or more inventory units to be consumed by removing at least one consumed inventory unit from the equipment and inserting at least one new inventory unit into the equipment.

8. The computer system of claim 7, wherein the plurality of sites include a base site and one or more remote sites, and wherein the base site provides inventory units to the one or more remote sites.

9. The computer system of claim 7, wherein the predictive model further uses as input a variance of the daily demand for each site of the plurality of sites, a variance of the supplier lead time for shipments of the inventory units, an item stockout cost parameter for each site of the plurality of sites, an item purchase cost parameter for each site of the plurality of sites, and an item holding cost parameter for each site of the plurality of sites.

10. The computer system of claim 7, wherein the predictive model further determines a total annual cost for the inventory units for the plurality of sites.

11. The computer system of claim 7, wherein the autonomous device causes the one or more inventory units to be consumed by performing an action selected from a group of: replacing a part of the equipment, applying a lubricant to the equipment, and inserting a fuel or energy source into the equipment.

12. The computer system of claim 8, wherein determining that the service level does not satisfy the threshold value comprises comparing the service level of the base site to the threshold value.

13. A computer program product for performing automated inventory management, the computer program product comprising one or more computer readable storage media collectively having program instructions embodied therewith, the program instructions executable by a computer to cause the computer to:

determine a service level, using a predictive model, for a count of inventory units for one or more sites of a plurality of sites, wherein the predictive model is provided with a reorder point and reorder quantity as input, wherein the predictive model further uses as input a mean daily demand for each site of the plurality of sites, an average issue size at each site of the plurality of sites, a mean supplier lead time for shipments of the inventory units, a price per inventory unit, and a central-to-remote site transfer time, and wherein the count of inventory units for the one or more sites is determined based on a notification that an autonomous robotic device at a particular site has performed an action that consumes one or more inventory units;

in response to determining that the service level does not satisfy a threshold value, adjust the reorder point;

determine that the adjusted reorder point yields a corresponding service level, wherein the input to the predictive model is used to determine that, according to the predictive model, the corresponding service level provided by the adjusted reorder point satisfies the threshold value;

automatically transmit instructions, using a network interface, to cause a reorder of inventory units in response to determining that a count of inventory units is below the adjusted reorder point; and control the autonomous robotic device, by transmitting instructions using the network interface to the autonomous robotic device, to automatically maintain equipment at a site of the plurality of sites using the inventory units, wherein the autonomous robotic device automatically maintaining the equipment causes one or more inventory units to be consumed by removing at least one consumed inventory unit from the equipment and inserting at least one new inventory unit into the equipment.

14. The computer program product of claim 13, wherein the plurality of sites include a base site and one or more remote sites, and wherein the base site provides inventory units to the one or more remote sites.

15. The computer program product of claim 13, wherein the predictive model further uses as input a variance of the daily demand for each site of the plurality of sites, a variance of the supplier lead time for shipments of the inventory units, an item stockout cost parameter for each site of the plurality of sites, an item purchase cost parameter for each site of the plurality of sites, and an item holding cost parameter for each site of the plurality of sites.

16. The computer program product of claim 13, wherein the predictive model further determines a total annual cost for the inventory units for the plurality of sites.

17. The computer program product of claim 13, wherein the autonomous device causes the one or more inventory units to be consumed by performing an action selected from a group of: replacing a part of the equipment, applying a lubricant to the equipment, and inserting a fuel or energy source into the equipment.

18. The computer-implemented method of claim 1, wherein the predictive model includes a machine learning model that is trained using historical sets of inputs and corresponding service level outputs, and wherein the predictive model uses the trained machine learning model to perform the determining of the service level, the adjusting the reorder point, and the determining that the adjusted reorder point yields the corresponding service level, and wherein the predictive model is updated based on actual resulting service levels by comparing the actual resulting service levels to predicted service levels to retrain the predictive model.

19. The computer system of claim 7, wherein the predictive model includes a machine learning model that is trained using historical sets of inputs and corresponding service level outputs, and wherein the predictive model uses the trained machine learning model to perform the determining of the service level, the adjusting the reorder point, and the determining that the adjusted reorder point yields the corresponding service level, and wherein the predictive model is updated based on actual resulting service levels by comparing the actual resulting service levels to predicted service levels to retrain the predictive model.

20. The computer program product of claim 13, wherein the predictive model includes a machine learning model that is trained using historical sets of inputs and corresponding service level outputs, and wherein the predictive model uses the trained machine learning model to perform the determining of the service level, the adjusting the reorder point, and the determining that the adjusted reorder point yields the corresponding service level, and wherein the predictive model is updated based on actual resulting service levels by comparing the actual resulting service levels to predicted service levels to retrain the predictive model.

* * * * *